United States Patent [19]
Neff et al.

[11] Patent Number: 5,032,704
[45] Date of Patent: Jul. 16, 1991

[54] MULTI-PRESSURE CONTROL SYSTEM

[75] Inventors: Robert H. Neff, Birmingham, Mich.; Todd C. Voelker, Springboro, Ohio

[73] Assignee: MAC Valves, Inc., Wixom, Mich.

[21] Appl. No.: 571,134

[22] Filed: Aug. 22, 1990

[51] Int. Cl.$^5$ .............................................. B23K 11/00
[52] U.S. Cl. ...................................... 219/89; 219/91.2
[58] Field of Search ....................... 219/89, 91.2, 86.25

[56] References Cited
U.S. PATENT DOCUMENTS 4,135,076  1/1979  Beneteau ................................ 219/89
4,579,042  4/1986  Neff et al. ............................. 91/446

Primary Examiner—Clifford C. Shaw
Attorney, Agent, or Firm—Robert G. Mentag

[57] ABSTRACT

A multi-purpose control system for a backup type welding gun and similar apparatuses including a positioning directional control valve for controlling the extension and retraction of the positioning or backup cylinder. A multi-pressure air sequence circuit and a time delay means operatively connected to the air sequence circuit for controlling the admission of a predetermined low pressure into the retract port of a backup type welding gun positioning cylinder to speed up the extension movement of the position piston carrying a weld cylinder, and then to control the admission of a predetermined higher retraction pressure higher retraction into said retract port, after a predetermined time delay interval. A welding pressure four-way directional control valve operatively connects a multi-pressure selector air circuit to the weld cylinder operating port to provide a plurality of pre-set pressures to the weld cylinder operating port for carrying out welding operations at selective pressures and in selected sequences.

11 Claims, 3 Drawing Sheets

MULTI-PRESSURE CONTROL SYSTEM

BACKGROUND OF THE INVENTION

1. Technical Field

This invention relates generally to pneumatic control systems, and more particularly to a multi-pressure pneumatic control system for industrial air applications wherein a selective plurality of sequential and repetitive air pressures are required, as in the control of welding apparatuses and similar applications.

2. Background Information

A large number of the welding guns used in industry at the present time are of the backup type, and they are carried on robot arms for moving them between selected work stations, and for manipulating them at a plurality of work stations. A backup type welding gun employs a double air cylinder construction wherein a weld cylinder is formed in a position piston which is operatively mounted in a positioning cylinder, which may also be termed a backup cylinder. Operatively mounted in the weld cylinder is a weld cylinder rod and its coacting weld piston, which are extended and retracted by pressurized air, to and from an operative welding position at a work station. Due to the inherent structure of a backup type welding gun, and the fact that its internal movable parts are operated by pressurized air, there exists a problem of lost welding time because of the long positioning time involved in extending the combination position piston and weld cylinder to an operative position for a welding operation after the welding gun has been moved from one work station to another.

SUMMARY OF THE INVENTION

The present invention provides a multi-pressure control system which may be used to control welding and similar apparatuses. The multi-pressure control system is adapted for use in industrial air use applications where a plurality of sequential and repetitive air pressures are required together with an air sequence function, as for example, to minimize the time required to position the weld cylinder in a backup type welding gun. A backup type welding gun requires a position piston for extending and retracting an internally formed weld cylinder, in which is carried a weld cylinder rod and its coacting weld piston to and from an operative position at a work station. The multi-pressure control system of the present invention provides an air sequence means to select a lower pressure in the retract chamber of the positioning or backup cylinder during an extension movement of the position piston so as to speed up the positioning time of the position piston and the internally formed weld cylinder. Simultaneous to the weld cylinder positioning, the air pressure in the retract chamber of the positioning or backup cylinder is increased to open the weld gun tips, and to retract the position piston to the start position, when the weld cycle is completed. The sequence function is adapted to be carried out either by an air sequence circuit or a combination air and electric control circuitry. The multi-pressure control system of the present invention also is adapted to supply various selective, sequential pre-set air pressures to the weld cylinder rod for selective and sequential welding operations requiring various welding air pressures. The multi-pressure control system of the present invention is light-weight, fast in operation, compact in size, and it is ideally suited for robot arm mounting.

DESCRIPTION OF THE PREFERRED EMBODIMENTS

Figure 1:
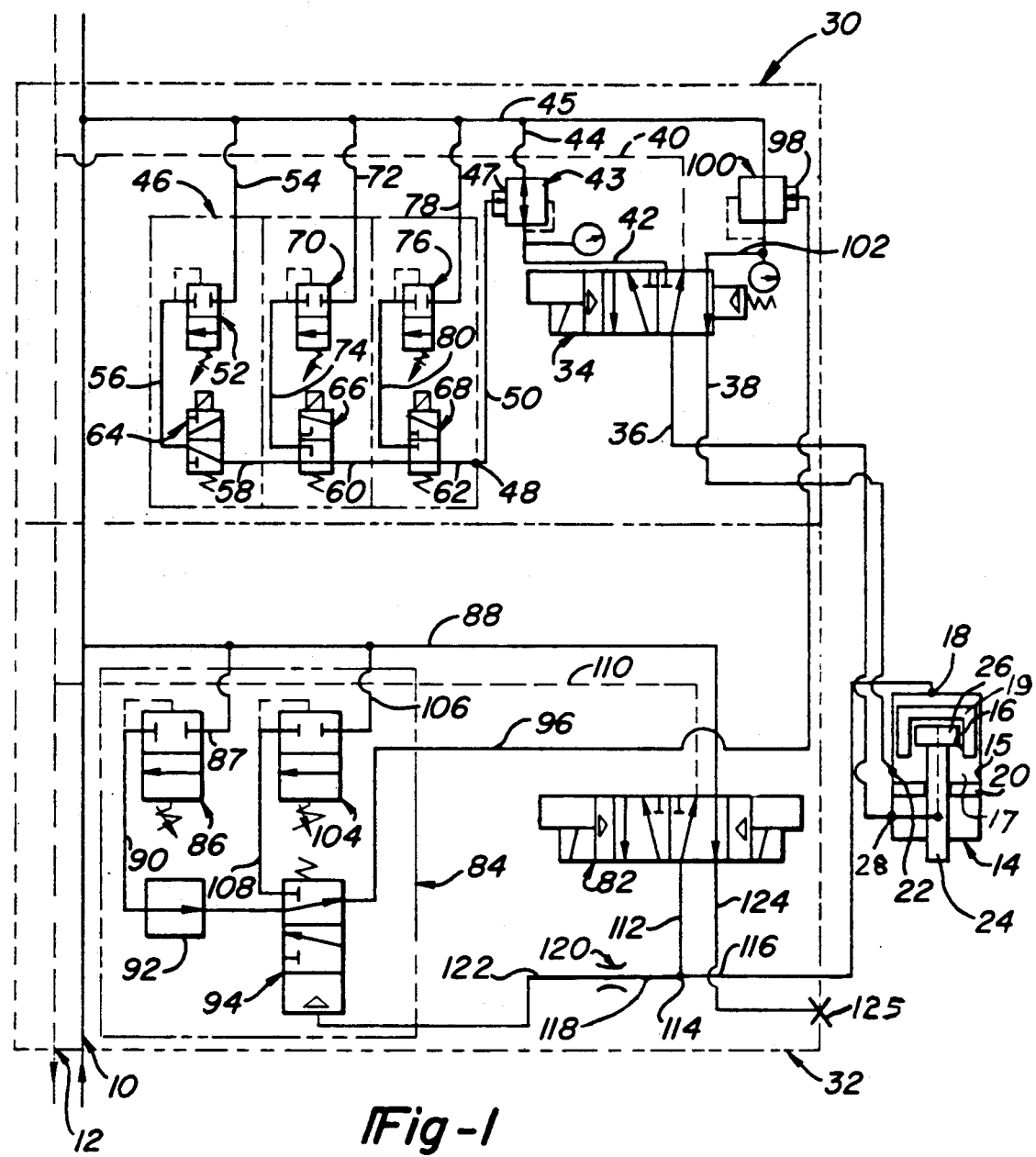
FIG. 1 is a circuit diagram of a multi-pressure pneumatic control system, made in accordance with the principles of the present invention, and showing the control system operatively connected to a schematically illustrated, conventional backup type welding gun.

Referring now to the drawing, and in particular to FIG. 1, the numeral 10 generally designates a pressurized main line air conduit which would be connected to a suitable supply source of pressurized air. The numeral 12 generally designates a suitable exhaust air conduit. The multi-pressure pneumatic control system of the present invention is illustrated in FIG. 1 as being used to control the operation of a backup type welding gun. It will be understood, that the multi-pressure pneumatic control system of the present invention may be used for controlling the operation of other type apparatuses. A backup type welding gun, generally indicated by the numeral 14, is schematically shown as including a positioning or backup cylinder 15 in which is operatively mounted a position piston 19 in which is formed a weld cylinder 16. A positioning or backup cylinder extend port 18 is formed in the upper end of the positioning or backup cylinder 15, for the admittance of pressurized air, for moving the position piston 19 and weld cylinder 16 downwardly against a reduced pressure of 20 p.s.i. at a common port 22 and in a retract chamber 17. The positioning or backup cylinder 15 contains a stop means 20 for stopping the downward movement of the weld cylinder 16. The positioning or backup cylinder 15 is provided with a common port 22 for the reception of pressurized air, as for example 80 p.s.i. to open the weld tips and retract the weld cylinder 16 when a weld cycle is completed. A weld cylinder rod 24 is carried by a weld cylinder piston 26 which is operatively mounted in the weld cylinder 16. Pressurized air is conveyed through a port 28 to a flow passage in the weld cylinder rod 24, through which it flows through the rod 24 and into the weld cylinder 16, behind the weld cylinder piston 26, and moves the weld cylinder piston 26 and rod 24 downwardly, for carrying out a welding operation. The position piston 19 and weld cylinder 16, and the weld cylinder rod 24 and weld cylinder piston 26 are retracted when extend port 18 is exhausted and retract pressure air (80 p.s.i.) is admitted into the retract chamber 17 through the common port 22. The retract chamber 17 comprises a lower portion of the positioning or backup cylinder 15.

The numeral 30 generally designates a multi-pressure welding control circuit for controlling the movement of the weld cylinder rod 24 to an operative position where the welding tip carried on the weld cylinder rod 24 engages a workpiece, and for opening the welding tips and retracting the combination position piston 19 and the internally formed weld cylinder 16. The numeral 32 generally indicates an air pressure circuit that includes a positioning control valve for extending the position piston 19 and weld cylinder 16, and a multi-pressure control circuit which controls the air pressure in the retract chamber 17 in the positioning or backup cylinder 15.

The multi-pressure welding control circuit 30 includes a four-way directional control valve, generally indicated by the numeral 34, which is solenoid operated in one direction and spring returned in the other direction. In the initial or de-energized position, one of the cylinder ports of the directional control valve 34 is connected by an air conduit 36 to the port 28 and thence to the weld cylinder rod 24. The other cylinder port in the directional control valve 34 is connected by an air conduit 38 to the common port 22 in the positioning or backup cylinder 15. The directional control valve 34 is provided with an exhaust port which is connected by an exhaust conduit 40 to the general exhaust line 12. Any suitable solenoid operated, four-way directional control valve may be employed to carry out the function of the four-way directional control valve 34, such as a directional control valve available on the market from MAC Valves, Inc. of 30569 Beck Road, Wixom, Mich. 48096, under Model No. 82.

One of the inlet ports of the four-way directional control valve 34 is connected by an air conduit 42 to one end of a conventional sandwich air pilot pressure regulator, generally indicated by the numeral 43. The other end of the sandwich air pilot pressure regulator 43 is connected by the air conduits 44 and 45 to the main line air conduit 10. As shown in FIG. 1, the air pilot 47 of the sandwich pressure regulator 43 is connected by an air conduit 50 to a common outlet 48 of a pilot air pressure selector circuit, generally indicated by the numeral 46. The pilot air pressure selector circuit 46 comprises a plurality of pressurized air conduit means which are connected in parallel with each other, and which each have one end operatively connected to the pressurized air supply source 10 and the other end thereof operatively connected to the air pilot 47 of the pilot air operated sandwich pressure regulator valve 43.

The pilot air pressure selector circuit 46 includes a first pressurized air conduit means that incorporates a first spring operated, pre-set output pressure regulator valve, generally indicated by the numeral 52, which has one side connected to the pressurized air supply source 10 through the air conduits 54 and 45. The other side of the pressure regulator valve 52 of the first pressurized air conduit means is connected to the air pilot 47 of the sandwich air pilot pressure regulator 43 by the pressure selector circuit air conduits 56, 58, 60, 62, the common outlet 48, the air conduit 50, and a normally open passage through each of the three, solenoid operated three-way valves, generally indicated by the numerals 64, 66 and 68.

The pressure selector circuit 46 includes a second pressurized air conduit means which is parallel to the first described pressurized air conduit means and which includes a second spring operated, pre-set output pressure regulator valve, generally indicated by the numeral 70, and which is connected on one side, by the air conduits 72 and 45, to the pressurized air supply source conduit 10. The other side of the pressure regulator valve 70 is connected by an air conduit 74 to a normally closed port in the solenoid operated, three-way control valve 66. When the three-way valve 66 is operated, it blocks air conduit 58 and connects the air conduit 74, to the air pilot 47 of the sandwich pilot air pressure regulator 43 through the air conduits 60, 62, 50, the common outlet 48, and the normally open passageway through the three-way solenoid operated valve 68.

The pressure selector circuit 46 includes a third pressurized air conduit means which is parallel to the first and second described pressurized air conduit means and which includes a third spring operated, pre-set output pressure regulator valve, generally indicated by the numeral 76, which is connected on one side thereof, by the air conduits 78 and 45, to the pressurized air supply source conduit 10. The other side of the pressure regulator valve 76 is connected by an air conduit 80 to a normally closed port in the solenoid operated, three-way control valve 68. When the three-way valve 68 is operated, it blocks air conduit 60 and connects the air conduit 80 to the air pilot 47 of the sandwich pilot air pressure regulator 43 through the air conduits 62, 50, and the common outlet 48.

Any suitable spring operated, pressure regulator valve may be employed for carrying out the regulator valve function of the pressure selector circuit regulator valves, 52, 70 and 76, such as a regulator valve available on the market from MAC Valves, Inc. of 30569 Beck Road, Wixom, Mich. 48096, under model No. 251B-XXYBA. Any suitable solenoid operated, three-way valve may be employed for carrying out the function of the solenoid operated, control valves 64, 66, 68, such as a three-way valve available on the market from MAC Valves, Inc. of 30569 Beck Road, Wixom, Mich. 48096, under Model No. 257B-11B.

The positioning control circuit 32 includes a four-way directional control valve, generally indicated by the numeral 82, which is solenoid operated in both directions. Any suitable solenoid operated, directional control valve may be employed to carry out the function of the four-way control valve 82, such as a four-way control valve available on the market from MAC Valves, Inc. of 30569 Beck Road, Wixom, Mich. 48096, under Model No. 6300.

The multi-pressure positioning control circuit 32 further includes a multi-pressure air sequence circuit, generally indicated by the numeral 84. As shown in FIG. 1, the multi-pressure air sequence circuit 84 includes a first spring operated, pre-set output pressure regulator valve, generally indicated by the numeral 86, which has one side thereof connected to the pressurized air supply source conduit 10 by the air conduits 87 and 88. The other side of the pressure regulator valve 86 is connected by an air conduit 90 and a conventional bypass valve 92 to an inlet port of a normally open passage through a three-way pilot air piston operated valve, generally indicated by the numeral 94. The outlet port of the normally open passage through the three-way valve 94 is connected to one end of an air conduit 96 which has its other end connected to the air pilot 98 of a conventional sandwich air pilot regulator valve, generally indicated by the numeral 100, and which is located in the multi-pressure welding control circuit, generally indicated by the numeral 30. One side of the sandwich air pilot pressure regulator valve 100 is connected by the air conduit 45 to the pressurized air supply source conduit 10. The other side of the sandwich air pilot pressure regulator valve 100 is connected by an air conduit 102 to an inlet port in the directional control valve 34. The directional control valve 34 is shown in the de-energized position in FIG. 1, and in the de-energized position the air conduit 102 is connected through an open passage through the directional control valve 34 to the air conduit 38 which is connected to the common retract port 22 which connects to the retract chamber 17 in the positioning or backup cylinder 15.

The multi-pressure air sequence circuit 84 includes a second spring operated pre-set output pressure regulator valve, generally indicated by the numeral 104, which has one side connected through the air conduits 106 and 88 to the pressurized air supply source conduit 10. The other side of the pressure regulator 104 is connected by the air conduit 108 to a normally closed port in the three-way pilot air piston operated valve 94.

In the position shown in FIG. 1, the four-way directional positioning control valve 82 has an exhaust port connected to an exhaust air conduit 110 which in turn is connected to the main exhaust line 12. The exhaust port is shown as being connected by an open passage through the directional control valve 82 to an air conduit 112 which is connected to an air conduit junction 114. One end of an air conduit 116 is connected to the air conduit junction 114 and the other end thereof is connected to the port 18 in the positioning or backup cylinder 15. An air conduit 118 connects the air conduit junction 114 to one end of a conventional fixed orifice flow control valve, generally indicated by the numeral 120. It will be understood, that the flow control valve 120 may be an adjustable flow control valve if such is needed. The other end of the flow control valve 120 is connected by an air conduit 122 to the pilot air piston end of the three-way valve 94.

It will be seen that the multi-pressure welding control circuit 30 permits the quick and efficient changing of working air pressures fed to an apparatus, such as the welding gun 14, and to other apparatuses wherein a plurality of different working air pressures are required in a desired sequence. The pressure selector circuit 46 is illustrated as including three, three-way solenoid operated valves 64, 66, and 68, with each of said valves being provided with its own individual regulator valve 52, 70 and 76, respectively. However, it will be understood that more than three such combinations of these valves and regulators may be employed to provide a desired number of pressure applications. Once the pressure at each of the individual pressure regulators 52, 70 and 76 has been manually pre-set, energizing a corresponding one of the three-way solenoid valves 64, 66 or 68, will provide a particular pressure at the common outlet 48 of the pressure selector circuit 46. The pre-selected pressure at the common outlet 48 is connected to the air pilot 47 of the sandwich regulator valve 43, and the regulator valve 43 conveys a predetermined working air pressure to the welding gun 14. The multiple pressures which can be manually pre-set in the pressure selector circuit 46 may reasonably vary from 30 to 120 p.s.i.

The multi-pressure control system of the present invention is illustrated as applied to the control of a welding gun 14, but it will be understood that the multi-pressure control system may be used for other applications to control other types of pneumatically operated apparatuses. It will also be understood that in the course of a sequence of welding operations, the required working air pressures for a welding gun may vary from step to step in a series of welding steps, which action would require the constant changing of the working air pressures by the pressure selector circuit 46. However, in explaining the operation of the multi-pressure control system of the present invention it will be assumed that a working pressure of 80 p.s.i. is required for a series of welding steps or operations. Accordingly, it will also be assumed that the regulated pressures to be required from the pressure regulators 86 and 104 in the multi-pressure air sequence circuit 84 will be 20 p.s.i. from the regulator valve 86 and 80 p.s.i. from the regulator valve 104. The regulator valves 86 and 104 would thus be manually set to 20 p.s.i. and 80 p.s.i., respectively.

Figure 3:
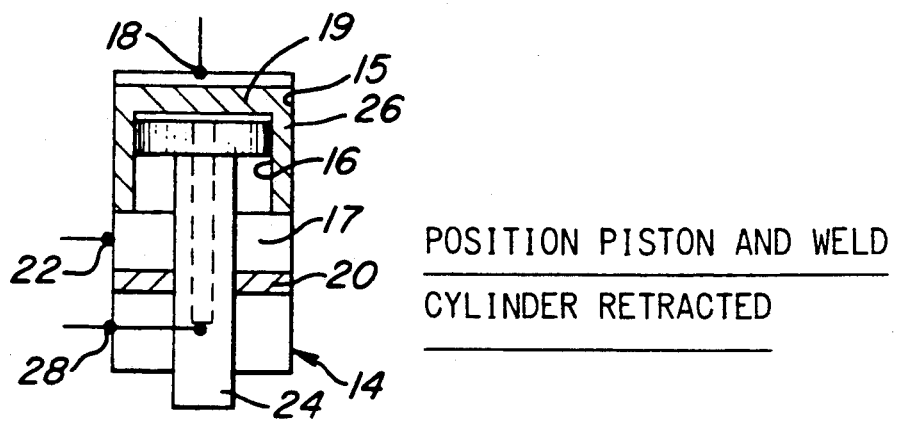
FIGS. 3, 4 and 5 are schematic illustrations of the backup type welding gun shown in FIG. 1, and showing the combination position piston and weld cylinder in a retracted position, in an extended position for a welding operation, and in an extended position with the weld cylinder rod and piston in a welding operation position, respectively.
Figure 4:
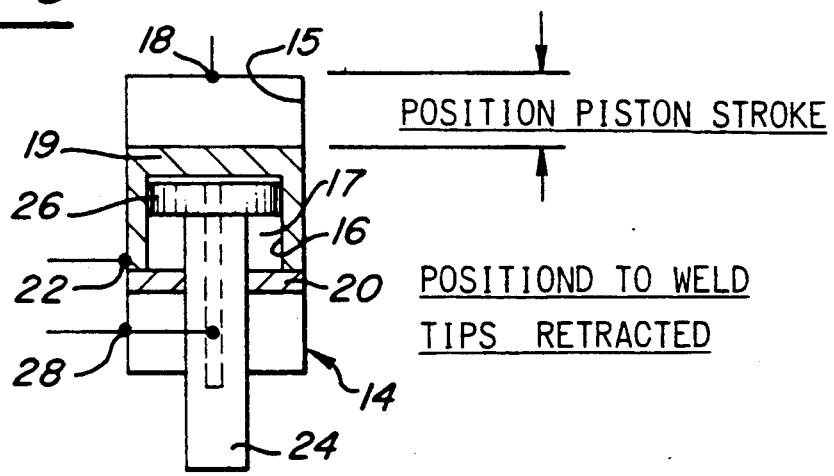

In many welding applications a backup type welding gun, such as the welding gun 14 is carried on a robot arm which moves the welding gun between welding locations or work stations, at each of which the welding gun 14 performs a welding operation. In some instances the movement of the weld cylinder rod 24 is obstructed by some raised structure on a workpiece, and the position piston 19 and weld cylinder 16 must then be retracted to the retracted position shown in FIG. 3, to retract the weld cylinder rod 24, and thereafter extended to move the weld cylinder rod 24 into a welding operative position, with the weld tips retracted, as shown in FIG. 4. The robot arm thus moves the welding gun 14 between the locations or positions but it is necessary to change the position of the weld cylinder rod 24 by means of the position piston 19 and weld cylinder 16 to clear obstructions on the workpiece during movement between welding locations. A problem encountered in the aforementioned retraction and extension movements of the position piston 19 and weld cylinder 16, in the prior art welding guns, is that the 80 p.s.i. pressure in the retract chamber 17 is exerted on the lower end area of the combination position piston 19 and weld cylinder 16, and it is equal to the 80 p.s.i. extension pressure exerted on the larger upper end area of the combination position piston 19 and weld cylinder 16, and a delay is encountered in extending the position piston 19 and weld cylinder 16. The reason the 80 p.s.i. pressure is present in the retract chamber 17 in the positioning or backup cylinder 15, is that some galvanization of the metal occurs during a welding operation, and an 80 p.s.i. pressure is required to retract the weld cylinder rod 24 carrying the welding tip, and to separate the welding tips from the metal. The present invention provides a multi-pressure control circuit for reducing the extension time of the position piston 19 and weld cylinder 16, whereby if for example the prior art extension time amounts to approximately 3 seconds, the use of the multi-pressure control system of the present invention can reduce the extension time, as for example, to ¼ of a second. The multi-pressure control system of the present invention functions in the following described manner to reduce the extension time of the position piston 19 and weld cylinder 16, and permit the position piston 19 and weld cylinder 16 to be extended and carry the weld cylinder rod 24 to a welding location in a minimum of time.

When the multi-pressure control system of the present invention is in the condition shown in FIG. 1, pressurized air at 20 p.s.i. is conveyed from the pressure regulator 86 and through a normally open passage in the three-way valve 94, to the air conduit 96, and thence to the air pilot 98 of the sandwich pressure regulator 100. The pressure regulator 100 regulates the line pressure coming in through the air conduit 45 to 20 p.s.i. and conducts it into the air conduit 102 from where it passes through an open passageway in the four-way directional control valve 34. The air conduit 38 then conducts the 20 p.s.i. pressurized air to the common retract port 22 and thence into the retract chamber 17, in the positioning or backup cylinder 15. The 20 p.s.i. pressurized air acts on the lower side of the weld cylinder piston 26 in the weld cylinder 16 and the lower side of the position piston 19, to hold these welding gun parts in a retracted position, as shown in FIG. 3, and prevent them from falling by gravity out of the retracted position when the 80 p.s.i. pressure is exhausted from the retract chamber 17, as explained hereinafter during, an extension action.

In the initial position of the positioning directional control valve 82 as shown in FIG. 1, the upper end of the positioning or backup cylinder 15 is exhausted through the air conduits 116 and 112, the junction 114, and through an open passage in the four-way control valve 82, and the exhaust line 110, to the main exhaust line 12. The numeral 125 in FIG. 1 designates a plug (shown by the letter "X") which blocks conduit 124 and makes the four-way valve 82 function as a three-way valve.

The position piston 19 with the internally formed weld cylinder 16 is extended by operating the four-way positioning directional control valve 82, to move it to the right of the position shown in FIG. 1, whereby line pressure of 80 p.s.i. passes into the conduit 112 and through the junction 114 into the conduit 116, and thence through the extend port 18 into the upper end of the positioning or backup cylinder 15 to move the position piston 19 and weld cylinder 16 downwardly, to the position shown in FIG. 4, where the weld cylinder piston 26 and rod 24 are positioned to weld with the welding tips retracted.

When the positioning directional control valve 82 is moved to the right of the position shown in FIG. 1, line pressure of 80 p.s.i. simultaneously flows through the conduit junction 114 and into the air conduit 118 and through the fixed orifice flow control valve 120 and thence through the air conduit 122 into operative engagement with the piston of the pilot air piston operator for the three-way valve 94 in the air sequence circuit 84. Due to the restriction of the fixed orifice flow control valve 120, the three-way valve 94 is not shifted immediately, but is shifted after a delay of a small increment of time, so as to energize the valve 94 and connect the air conduit 108 carrying 80 p.s.i. pressure to the air conduit 96, which in turn conveys the 80 p.s.i. pressure to the pilot operator 98 of the pressure regulator 100. 80 p.s.i. pressure is then conveyed through the air conduit 102, the welding pressure valve 34, and the air conduit 38 to the common retract port 22, and into the retract chamber 17, after the extension movement of the position piston 19 and weld cylinder 16 is accomplished. At that point in the operation of the welding gun 14 there is 80 p.s.i. pressure at extend port 18 and in the positioning or backup cylinder 15 above the position piston 19 and weld cylinder 16, and there is 80 p.s.i. pressure at retract port 22 and in the retract chamber 17 below the position piston 19 and weld cylinder 16.

Figure 5:
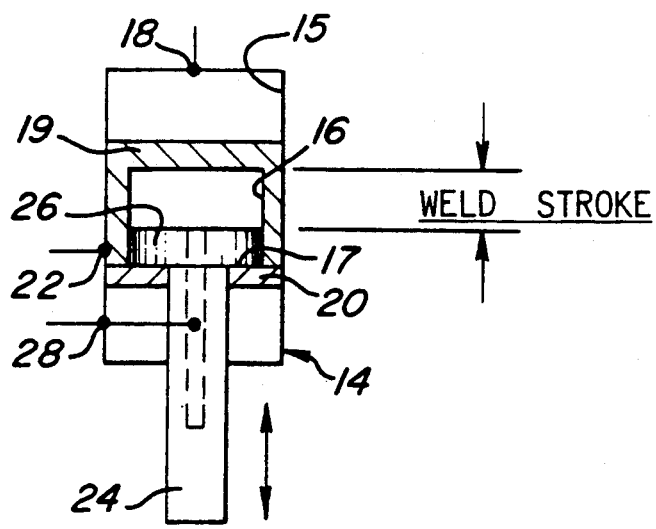

The welding pressure four-way valve 34, is then energized to move the valve 34 to the right, against the pressure of its return spring, so as to permit the selected air pressure from the pressure selector circuit 46 to be conveyed through the air conduit 36 into the weld cylinder gun rod port 28 and up through a passage in the weld cylinder rod 24 and into the weld cylinder 16 behind the weld cylinder piston 26, to move the weld cylinder piston 26 and rod 24 downwardly through the weld stroke, as shown in FIG. 5, into a welding engagement with a workpiece, while simultaneously exhausting the retract chamber 17 through port 22. The welding pressure four-way valve 34 is then reversed and returned to its initial position shown in FIG. 1. The air under pressure behind the weld cylinder piston 26 is exhausted through the port 28 and air conduit 36 to the exhaust line 40. The position shown in FIG. 1 and the inlet port 18 is exhausted through air conduits 112 and 116. The position piston 19 and weld cylinder 16, carrying the weld cylinder piston 26 and weld cylinder rod 24 is moved to the retracted position, as shown in FIG. 3 by 80 p.s.i. being admitted to the retract port 22 through air conduits 38, 102, and 45 and regulator 100. Air conduit 122 is exhausted and the three-way valve 94 is returned to the position shown in FIG. 1, thereby blocking 80 p.s.i. from the regulator valve 104, and opening air conduit 96 to 20 p.s.i. air pressure. More particularly the 80 p.s.i. extension pressure has been exhausted through the extend port 18 and through the air conduits 116 and 112 and an open passage in the positioning directional control valve 82 and into the exhaust line 110. The air pressure is fed back from the pilot air piston operator of the three-way valve 94, and out through the air conduit 122, the fixed orifice flow control valve 120, the conduit 112, an open passage in the positioning directional control valve 82, and out through the exhaust line 110, to move the valve 94 to the position shown in FIG. 1 to again admit 20 p.s.i. pressure through the air conduit line 96 and the pressure regulator 100 and down through the conduit 102 and through the valve 34 and the conduit 38 and through the common retract port 22 and under the lower side of the position piston 19 and weld cylinder 16, and the weld cylinder piston 26.

The aforedescribed air sequence action of the multi-pressure control system shown in FIG. 1, permits the position piston 19 and weld cylinder 16 to be extended quickly against the lower 20 p.s.i. pressure, and it also provides an 80 p.s.i. pressure on the upper side of the position piston 19 and weld cylinder 16 when they are in the extended position (FIG. 4) to hold them in the welding position for a welding operation, and to have 80 p.s.i. pressure admitted to the retract chamber 17 in the positioning or backup cylinder 15 after the extension movement of the position piston 19 and weld cylinder 16 for retracting them after a welding operation. It will be seen that the time increment of delay may be controlled by employing an adjustable flow control valve instead of the fixed orifice flow control valve 120. It will be understood that, the sequence in operating the directional control valves 34 and 82 may be controlled by any suitable means, such as by a suitable electrical control circuit.

Figure 2:
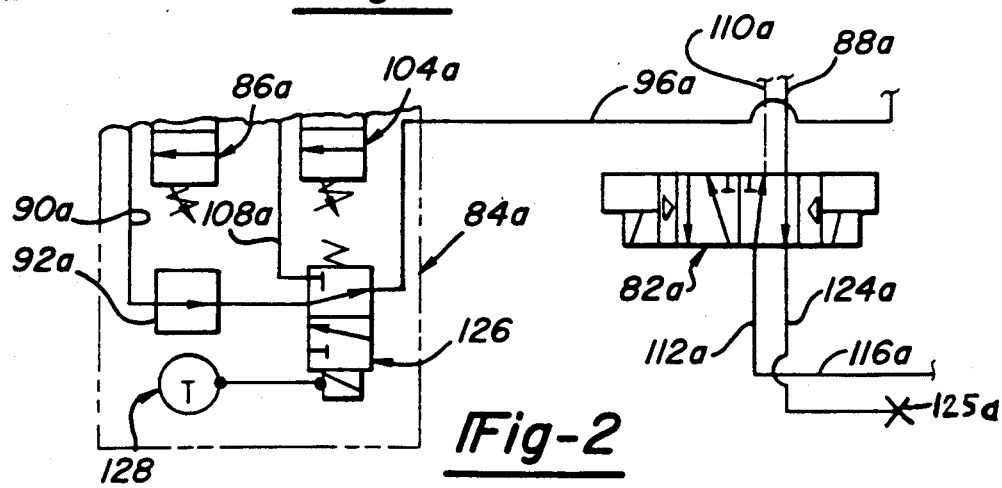
FIG. 2 is a fragmentary portion of the circuit diagram illustrated in FIG. 1, and showing a first modified embodiment thereof that includes an electrical time delay which may be employed in the multi-pressure control system of FIG. 1, instead of the air sequence circuit employed in the embodiment of FIG. 1.

FIG. 2 is a fragmentary portion of the circuit diagram illustrated in FIG. 1, which discloses a modified embodiment thereof in which an electrical time delay is employed in the multi-pressure time delay control system of FIG. 1 instead of the air sequence employed in the circuit of FIG. 1.

In the modified embodiment of FIG. 2, the parts of the circuit of FIG. 2 which are the same as the corresponding parts of the circuit in FIG. 1 have been marked with the same reference numerals followed by the small letter "a".

In the modified embodiment of FIG. 2, the three-way pilot air piston valve 94 has been replaced with a solenoid operated three-way valve, generally indicated by the numeral 126. A suitable electric timer, generally designated by the numeral 128 is operatively connected to the solenoid for the valve 126 and would be controlled by a suitable control circuit incorporated in the overall circuit for the operation of the directional control valve 34, to provide shifting of the three-way valve 126 and provide the desired 20 p.s.i. pressure to the common retract port 22, or the 80 p.s.i. of pressure to the common retract port 22, in the desired sequence. In the operation of the embodiment of FIG. 2, the solenoid on the positioning directional control valve 82a, for shifting the valve 82a to the right, from the initial position shown in FIG. 2, would be energized simultaneously with the energizing of the solenoid for operating the three-way valve 126, to shift the three-way valve 126 after a predetermined time delay, to change the flow of 20 p.s.i. pressure from the pressure regulator valve 86a to a flow of 80 p.s.i. pressure from the pressure regulator valve 104a.

It will be seen from the aforegoing description of the operation of the multi-pressure control system of the present invention, that the positioning or backup cylinder 15 of the backup type welding gun disclosed in FIG. 1 is always subjected to a retract pressure of 80 p.s.i. with the exception of the delay time interval when the positioning directional control valve 82 is moved to cause an extension of the position piston 19 and weld cylinder 16, so that for a very brief interval only a pressure of 20 p.s.i. is admitted to the common retract port 22 to permit the position piston 19 and weld cylinder 16 to be quickly and efficiently extended, from the position shown in FIG. 3 to the position shown in FIG. 4, after which the 80 p.s.i. pressure is again admitted to the common retract port 22.

The pilot air pressure selector circuit 46 is similar to the pilot air pressure selector circuit 43 shown in U.S. Pat. No. 4,579,042, entitled "Selective Air Pressure Control System For Welding and Like Apparatus", and which patent is assigned to MAC Valves, Inc. of 30569 Beck Road, Wixom, Mich. 48096. The teachings of said U.S. Pat. No. 4,579,042 are incorporated herein by reference. The pilot air pressure selector circuit 46 includes a series of solenoid pilot valves, each with its own individual pressure regulator, which are ganged together in a manifold that contains an internal cascading circuit having a single common outlet 48.

Figure 6:
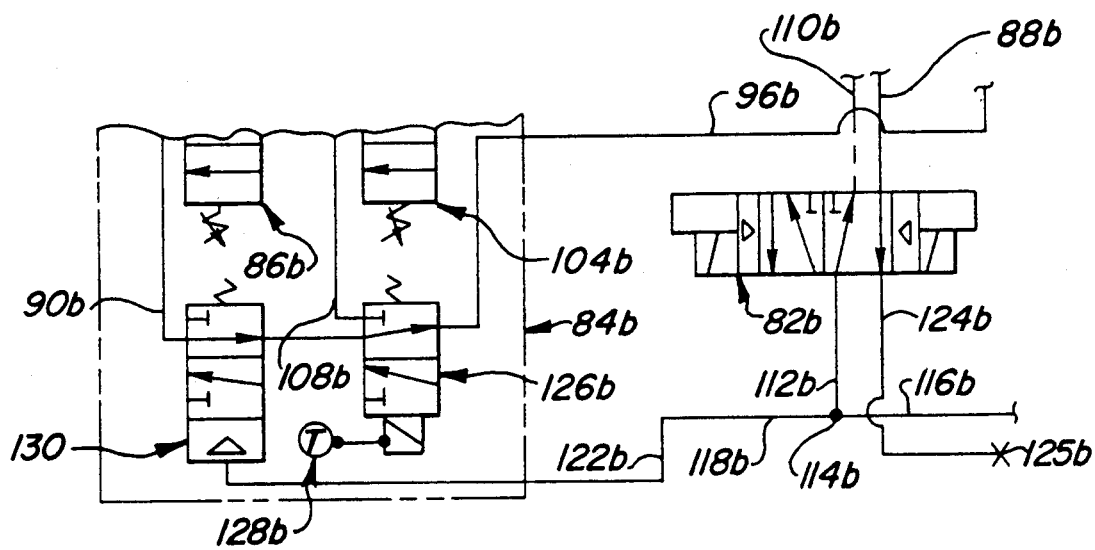
FIGS. 6 and 7 are fragmentary portions of the circuit diagram illustrated in FIG. 1, and showing a second modified time delay means which may be employed in the multi-pressure control system of FIG. 1.

FIG. 6 is a fragmentary portion of the circuit diagram illustrated in FIG. 1, which discloses a second modified embodiment thereof in which a modified time delay means is employed in the multi-pressure time delay control system of FIG. 1 instead of the air sequence employed in the circuit of FIG. 1.

In the second modified embodiment of FIG. 6, the parts of the circuit of FIG. 6 which are the same as the corresponding parts of the circuits shown in FIGS. 1 and 2 have been marked with the same reference numerals followed by the small letter "b".

In the modified embodiment of FIG. 6, the three-way pilot air piston operated valve 94 has been replaced with a solenoid operated three-way valve, generally indicated by the numeral 126b. An electric timer, generally designated by the numeral 128b is operatively connected to the solenoid for the three-way valve 126b.

The bypass valve 92 has been replaced by a three-way pilot air piston operated valve 130. Pilot air for operating the three-way valve 130 is conducted thereto from the junction 114b through the air conduits 118b and 122b. In the operation of the embodiment of FIG. 6, the energizing of the solenoid for the positioning directional control valve 82b, for shifting this valve to the right, as viewed in FIG. 6, transmits a flow of 80 p.s.i. pressure to the extend port 18 through the conduits 112b and 116b, and also to the pilot air piston of the three-way valve 130 through the air conduits 118b and 122b to cause a shifting of the three-way valve 130 to a position to block the flow of 20 p.s.i. air from the regulator valve 86b, and to dump or exhaust to the atmosphere the 20 p.s.i. pressure at the port 22 and in the retract chamber 17 down to zero for a brief time interval during which the 80 p.s.i. pressure acting at the extend port 18 can quickly move the position piston 19 to its extended position. The solenoid for operating the three-way valve 126b is then energized by the time delay means or timer 128b to admit 80 p.s.i. from the air conduit 108b into the air conduit 96b. It will be understood that the function of the time delay means 128b, for energizing the valve 126b, may be incorporated in or carried out by the welding machine main control circuitry.

The solenoid for the three-way valve 126b would stay energized during the welding operation and would be deenergized when the directional control positioning valve 82b is returned to the initial position shown in FIG. 1, and 20 p.s.i. pressure would again be conveyed to the air conduit 96b.

Figure 7:
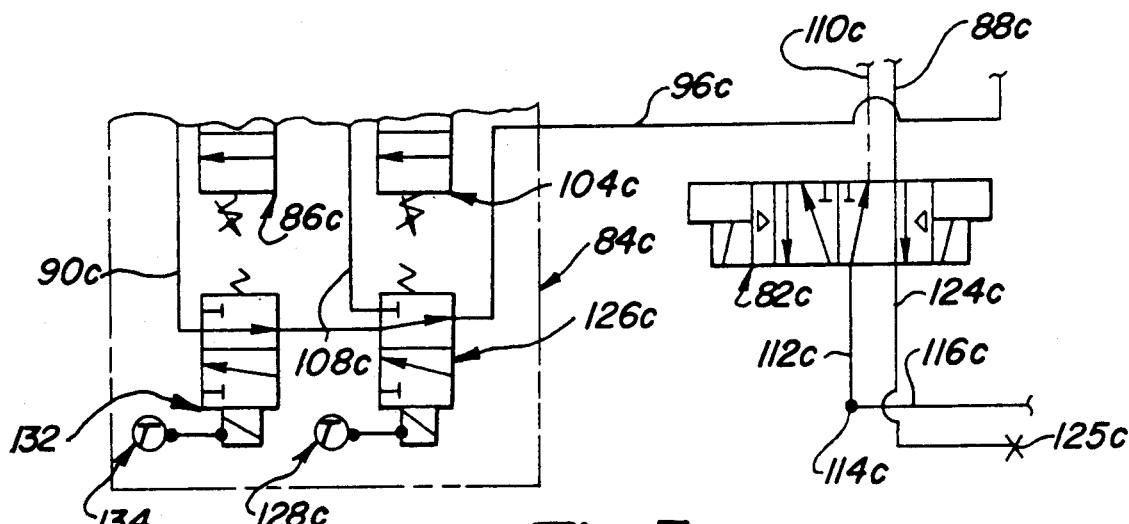

FIG. 7 is a fragmentary portion of the circuit diagram illustrated in FIG. 1, and it discloses a third modified embodiment, in which a modified time delay means is employed in the multi-pressure time delay control system of FIG. 1 instead of the air sequence employed in the circuit of FIG. 1.

In the third modified embodiment of FIG. 7, the parts of the circuit of FIG. 7 which are the same as the corresponding parts of the circuits shown in FIGS. 1, 2 and 6 have been marked with the same reference numerals followed by the small letter "c".

The embodiment of FIG. 7, is a modification of the sequence circuit 84b of FIG. 6. In the embodiment of FIG. 7, the three-way pilot air piston operated valve 130 of FIG. 6 has been replaced by a solenoid operated three-way valve, generally indicated by the numeral 132. An electric timer, generally designated by the numeral 134, is operatively connected to the solenoid for the three-way valve 132. In the operation of the embodiment of FIG. 7, the energizing of the solenoid for the positioning directional control valve 82c, for shifting this valve to the right, as viewed in FIG. 7, transmits a flow of 80 p.s.i. pressure to the extend port 18 through the conduits 112c and 116c. The solenoid for the three-way valve 132 is simultaneously energized with the last mentioned solenoid which shifts the positioning directional control valve 82c to the right, to cause a shifting of the three-way valve 132 to a position to block the flow of 20 p.s.i. air from the regulator valve 86c, and to dump or exhaust to the atmosphere the 20 p.s.i. pressure at the retract port 22 and in the retract chamber 17 down to 0, for a brief time interval during which the 80 p.s.i. pressure acting at the extend port can quickly move the position piston 19 to its extended position. The amount of time that the three-way valve 132 is in a position to create the aforementioned quick dump of 20 p.s.i. pressure for a small increment of time may be controlled by the time delay means or timer 134, or the time delay may be very incorporated in or carried out by the welding machine main control circuitry. The solenoid for operating the three-way valve 126c is then energized to admit 80 p.s.i. from the air conduit 108c into the air conduit 96c.

The solenoid for the three-way valve 126c stays energized during the welding operation and would be de-energized when the directional control positioning valve 82c is returned to the initial position shown in FIG. 1, and 20 p.s.i. pressure would again be conveyed to the air conduit 96c.

An advantage and novel feature of the sequence circuits 84, 84a, 84b and 84c is that no additional electrical outputs are required from the main controller for the welding apparatus for operating the sequence means 84, 84a, 84b and 84c. When the solenoid for moving the positioning directional control valve 82 to the right from its initial position is energized, the three-way valve 94 in the air sequence circuit 84 is sequentially operated. The electrical timers 128, 128b and 128c in the time delay or sequence circuits 84a, 84b and 84c are operated simultaneously by the same output from the main controller that is used to energize the positioning directional control valves 82a, 82b and 82c for the embodiments of FIGS. 2, 6 and 7, respectively.

What is claimed is:

1. A multi-pressure control system for supplying pressurized working air from a supply source to operate a backup type welding gun (14) having a positioning cylinder (15) in which is operatively mounted a position piston (19) that has an internally formed weld cylinder (16) in which is operatively mounted a weld cylinder piston (26) and a rod (24) which has a flow passage therethrough connected to a weld cylinder operating port (28), and wherein the positioning cylinder (15) includes an extend port (18) in the upper end thereof and a retract port (22) in the lower end thereof, characterized in that said system includes:

(a) a positioning directional control valve (82, 82a, 82b, 82c), shiftable between a first position and a second position, and which has a working air port connected to said pressurized working air supply source (10), an exhaust port, and one operating port, and a first air conduit means (112, 112a, 112b, 112c, 116, 116a, 116b, 116c) connected between said operating port and said positioning cylinder extend port (18);

(b) a multi-pressure air sequence circuit (84, 84a, 84b, 84c), a time delay means (118-122, 128, 128b, 128c) operatively connected to the multi-pressure air sequence circuit for selectively delaying the switch of the output pressure of the multi-pressure air sequence circuit, from a predetermined low pressure to a higher predetermined pressure, by a predetermined increment of time, and a second air conduit means (96, 96a, 96b, 96c-102,38) for connecting the multi-pressure sequence circuit to said retract port (22); and, (c) a welding pressure four-way directional control valve (34), shiftable between a first position and a second position, and having an operating port connected to the weld cylinder operating port (28), whereby, when the positioning directional control valve (82, 82a, 82b, 82c) is in the first position the positioning cylinder extend port (18) is connected by said first air conduit means (112, 112a, 112b, 112c, 116,116a,116b,116c) to the exhaust port of said positioning directional control valve, and pressurized air at said predetermined low pressure is conveyed from said multi-pressure air sequence circuit (84, 84a, 84b, 84c) to the retract port (22) in said positioning cylinder (15), and when said positioning directional control valve (82, 82a, 82b, 82c) is shifted to the second position, pressurized working extend air is conducted through said first air conduit means (112, 112a, 112b, 112c, 116, 116a, 116b,116c) and into the positioning cylinder extend port (18) to move the position piston (19) and weld cylinder (16) to an extended weld position in the positioning cylinder (15), and after a predetermined increment of time the multi-pressure air sequence circuit (84, 84a, 84b,84c) is operable by said time delay means (118-122, 128, 128b,128c) to increase the pressure of the air conveyed therefrom to the retract port (22) to said higher predetermined pressure, and the welding pressure four-way directional control valve (34) is then shifted to the second position to simultaneously exhaust the retract port (22) and send pressurized welding air to the weld cylinder operating port (28) to carry out a welding operation, after which the welding pressure four-way directional control valve (34) is shifted back to the first position to terminate the welding operation by blocking the flow of pressurized air to the weld cylinder operating port (28) and exhausting tne weld cylinder operating port (28) and conveying air at said higher predetermined pressure to said retract port (22) for returning the position piston (19) and weld cylinder (16) and the weld cylinder piston (26) and weld cylinder rod (24) to the retracted position, and the positioning directional control valve (82, 82a, 82b, 82c) is shifted back to the first position to exhaust the pressurized air from the extend port (18) through said first air conduit means (112, 112a, 112b, 112c, 116, 116a, 116b, 116c) to allow the retraction of the position piston (19) and weld cylinder (16), and to send pressurized air at said predetermined low pressure to said retract port (22).

2. A multi-pressure control system as defined in claim 1, wherein said multi-pressure air sequence circuit includes:

(a) a first pre-set output pressure regulator valve (86, 86a, 86b,86c) and a second pre-set output pressure regulator valve (104, 104a, 104b, 104c);

(b) each of the pre-set pressure output pressure regulator valves has one side connected to said source of pressurized working air supply source;

(c) said first pre-set output pressure regulator valve (86, 86a, 86b,86c) has the other side thereof connected through a normally open passage in a bypass valve means (92, 92a, 130, 132) and thence to a normally open passage through a three-way valve (94, 126, 126b, 126c) and thence to said second air conduit means 96a, 96b, 96c-102,38) to said positioning cylinder retract port (22) for transmitting pressurized air at said predetermined low pressure;

(d) said second pre-set output pressure regulator valve (104, 104a, 104b, 104c) has the other side thereof connected to a normally closed passage through said three-way valve (94, 126, 126b,126c); and, (e) said time delay control means (118–122, 128, 128b,128c) is operatively connected to said three-way valve to control the shifting of the three-way valve (94, 126, 126b, 26c) to a position to block the normally open passage therethrough and connect the normally closed passage therethrough to said second air conduit means (96, 96a, 96b, 96c–102,38) for transmitting pressurized air at said higher predetermined pressure to said positioning cylinder retract port (22) after a predetermined increment of time after the positioning directional control valve (82) has been moved to said second position.

3. A multi-pressure control system as defined in claim 2, wherein:

(a) said three-way valve comprises a pilot air piston operated valve (94); and, (b) said time delay means (118–122) comprises an air operated time delay means connected between the pilot air piston of said three-way valve and said first air conduit means (112, 116).

4. A multi-pressure control system as defined in claim 3, wherein:

(a) said air operated time delay means comprises a flow control valve (120).

5. A multi-pressure control system as defined in claim 2, wherein:

(a) said three-way valve comprises a solenoid operated valve (126, 126b,126c); and, (b) said time delay means comprises an electric timer (128, 128b,128c) operatively connected to the solenoid on said solenoid operated valve (126, 126b,126c).

6. A multi-pressure control system as defined in claim 5, wherein:

(a) said bypass valve means comprises a pilot air piston operated three-way bypass valve (130) which is connected by an air conduit means (118b, 122b) to said first air conduit means (112, 116), whereby when said positioning directional control valve (82b) is shifted to said second position the pilot air piston operated three-way bypass valve (130) is shifted into a position to block the normally open passage therethrough and to open the normally open passage through said three-way bypass valve to the atmosphere to exhaust the predetermined low pressure from the retract port (22), and when the positioning directional control valve (82b) is shifted back to said first position the pilot air piston operated three-way bypass valve (130) is shifted back to a position to unblock said normally open passage therethrough.

7. A multi-pressure control system as defined in claim 5, wherein:

(a) said bypass valve means comprises a solenoid operated three-way bypass valve (132), whereby when said positioning directional control valve (82c) is also shifted to said second position the solenoid operated three-way bypass valve (132) is shifted into a position to block the normally open passage therethrough and to open the normally open passage through said three-way bypass valve (132) to the atmosphere to exhaust the predetermined low pressure from the retract port (22), and when the positioning directional control valve (82c) is shifted back to said first position the solenoid operated three-way bypass valve (132) is shifted back to a position to unblock said normally open passage therethrough.

8. A multi-pressure control system as defined in claim 7, wherein:

(a) a time delay means comprising an electric timer (134) is operatively connected to the solenoid on said solenoid operated three-way bypass valve (132) for simultaneous operation with the positioning directional control valve (82c).

9. A multi-pressure control system as defined in claim 2, wherein said second air conduit means (96–102, 38) for connecting the multi-pressure air sequence circuit (84, 84a, 84b) to said positioning cylinder retract port (22) includes:

(a) a first air pilot pressure regulator valve (100) having an air pilot (98);

(b) an air conduit (96) having one end thereof connected to said three-way valve (94, 126, 126b) and the other pilot pressure regulator valve (100);

(c) an inlet side of the first air pilot pressure regulator valve (100) being connected to said pressurized working air supply source (10) and an outlet side thereof being connected through a normally open passage in said welding pressure four-way control valve (34) to an air conduit (38) to said positioning cylinder retract port (22) when the welding pressure valve (34) is in said first position.

10. A multi-pressure control system as defined in claim 9, including:

(a) a second air pilot pressure regulator valve (43) having an air pilot (47);

(b) an air conduit (44) having one end thereof connected to said pressurized working air supply source (10) and the other end thereof connected to the inlet side of the second air pilot pressure regulator valve (43), and the outlet side of the second air pilot pressure regulator valve (43) being connected by an air conduit (42) to a normally closed port in said welding pressure valve (34) when the last mentioned valve is in said first position; and, (c) a pilot air multi-pressure selector circuit means (46) connected between said working air supply source (10) and the pilot air operator (47) of said second air pilot pressure regulator valve (43) for selectively and sequentially providing a plurality of various pre-set pilot air pressures to the pilot air operator (47) of said second air pilot pressure regulator valve (43), for operating the second air pilot pressure regulator valve (43) to selectively and sequentially supply a plurality of various pre-set working pressures to said welding pressure four-way control valve (34) and thence to the weld cylinder operating port (28) for carrying out welding operations at selective pressures and in selected sequences.

11. A method for operating a pneumatic backup type welding gun (14), having a positioning cylinder (15) in which is operatively mounted a position piston (19) that has an internally formed weld cylinder (16) in which is operatively mounted a weld cylinder piston (26) and a rod (24) carrying a welding tip and which rod (24) has a flow passage therethrough connected to a weld cylinder operating port (28), and wherein the positioning cylinder (15) includes an extend port (18) in the upper end thereof and a retract port (22) in the lower end thereof, comprising the steps of:

(a) first, conveying pressurized air at a predetermined low pressure to the retract port (22) to maintain the weld cylinder piston (26) and rod (24) in the weld cylinder (16) in the position piston (19) in a retracted position;

(b) second, conveying pressurized air at a higher predetermined higher pressure to the extend port (18) to move the position piston (19) to an extended position, and after a time delay, increasing the predetermined low pressurized air to the retract port (22) to a predetermined higher pressurized air;

(c) third, carrying out at least one welding operation by simultaneously exhausting the retract port (22) and conveying welding pressurized air to the weld cylinder operating port (28) to move the weld cylinder piston (26) and rod (24) into a welding engagement with a work piece, and then, simultaneously exhausting the welding pressurized air from the weld cylinder operating port (28) and conveying pressurized air at said higher predetermined pressure to the retract port (22) to retract the weld cylinder piston (26) and rod (24);

(d) fourth, exhausting the pressurized air from the extend port (18) to permit the higher predetermined pressurized air conveyed to the retract port (22) to retract the position piston (19) to a retracted position.

* * * * *

UNITED STATES PATENT OFFICE
CERTIFICATE OF CORRECTION

Patent No. 5,032,704          Dated  July 16, 1991

Inventor(s) Robert H. Neff and Todd C. Voelker

It is certified that error appears in the above-identified patent and that said Letters Patent is hereby corrected as shown below:

Column 8, line 19, after "The" insert -- positioning directional control valve 82 is moved back to the--.

Claim 9, column 14, line 22, after "other", insert --end thereof connected to the air pilot (98) of said first air--.

Signed and Sealed this

Thirteenth Day of October, 1992

Attest:

DOUGLAS B. COMER

*Attesting Officer*          Acting Commissioner of Patents and Trademarks